June 1, 1926.
C. F. BLAKE
SHAFT COLLAR
Filed Sept. 18, 1923
1,586,959
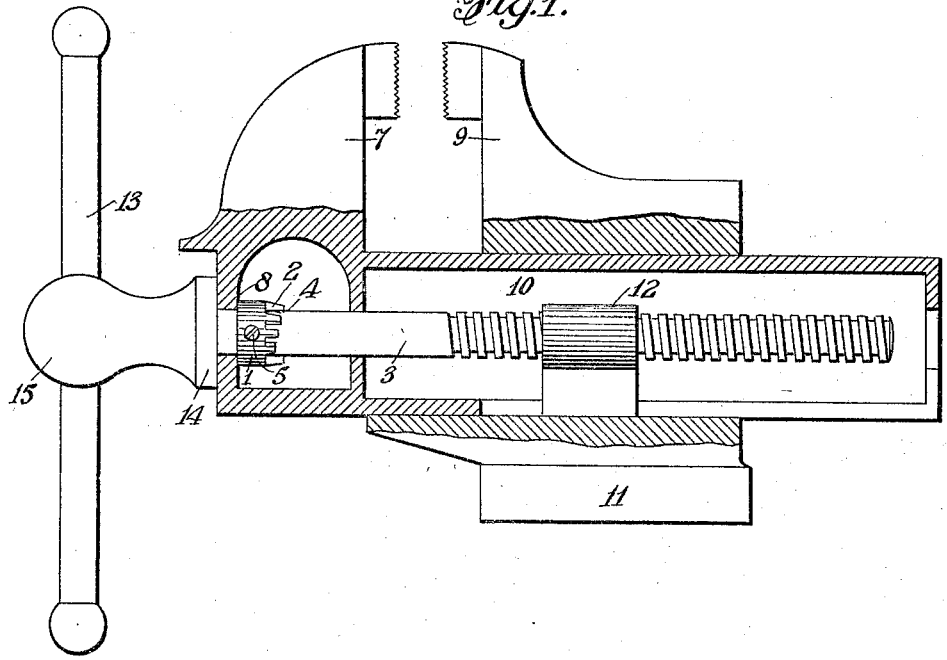
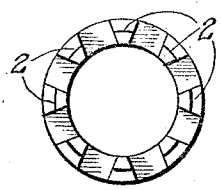 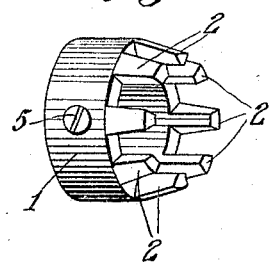
INVENTOR
Charles Foster Blake
BY
Kenyon & Kenyon
ATTORNEYS Patented June 1, 1926.

1,586,959

UNITED STATES PATENT OFFICE.

CHARLES FOSTER BLAKE, OF WATERTOWN, NEW YORK, ASSIGNOR TO PRENTISS VISE COMPANY, INC., OF NEW YORK, N. Y., A CORPORATION OF NEW YORK.

SHAFT COLLAR.

Application filed September 18, 1923. Serial No. 663,342.

My invention relates to shaft collars and more particularly to collars of that character which are adapted to be positioned on a shaft and thereafter to be fixed in permanent relation to the shaft to prevent any relative movement of the shaft and collar. Although I have described and illustrated my invention herein by reference to its particular embodiment on the screw shaft of an ordinary jaw vise it will be apparent that it may be used in connection with a great variety of devices.

The object of my invention is to provide a shoulder or collar of simple construction and so made as to be easily yet positively and permanently mounted on a shaft at any desired position thereon, particularly with reference to the shaft's longitudinal axis.

I reach this result by constructing a ring or collar provided with projections along one of its lateral edges, the projections being adapted to be bent down into notches cut in the shaft, as will more fully hereinafter appear.

The kind of collar in common use heretofore adapted to be mounted upon a shaft as for example upon the screw shaft of a vise, has been a collar positioned by means of a common set screw. This method of positioning has proved unsatisfactory because of the tremendous strain upon the set screw when it is screwed home tightly enough to hold, which results in the threads of the screw soon becoming battered and worn and giving way. When the set screw construction is used the act of screwing the set screw up against the shaft, instead of bringing the inside surface of the collar or ring into closer contact with the surface of the shaft— a result greatly desirable—tends actually to force the collar away from the shaft at that point so that the desired close engagement between the collar and the shaft does not take place except on the side of the shaft opposite the set screw and at the comparatively small point of the screw. Consequently, a heavy thick ring is necessary, and in any event too much work of holding is placed upon the set screw. I avoid these difficulties by providing a collar having integral projections adapted to engage notches in the shaft so as to secure positive and permanent engagement between the shaft and collar, and I do away with the set screw altogether except as it may be desired as an auxiliary element.

In the accompanying drawings, forming a part of this specification in which similar numerals refer to similar parts throughout the different views, I have shown my invention applied to an ordinary jaw vise.

Figure 1 shows the said invention as applied to a vise in side elevation.

Figure 2 is an end view of the collar alone.

Figure 3 is a perspective view of the collar.

Referring more particularly to Figure 1, 10 refers to the body casting of the vise on its support 11. 9 is the stationary jaw of the vise, 7 the movable jaw, moved toward and away from 9 through the turning of the screw shaft 3. The annular member 1 (variously spoken of in this specification as a collar, ring, etc.) has projections 2 preferably of unequal lengths and is mounted upon the screw shaft 3. In the shaft 3 are cut one or more notches 4. All parts throughout are or may be of metal of the usual kinds employed in the construction of vises except that the collar 1 or the projections 2 forming a part thereof should be of some metal malleable enough to bend slightly without breaking. A set screw 5, as shown in Fig. 1, may be screwed through the collar 1 until its point engages the shaft 3.

The method of assembling my device is as follows: The notch or notches having been formed beforehand in the screw shaft 3 at approximately the proper place thereon, the collar 1 is inserted over the screw end of the shaft 3 by being slipped through an aperture in the bottom or sides of the main body of the vise. The screw shaft is then thrust endwise through the collar 1 until the threads on the shaft engage the threads of the female screw 12 in the body of the vise. The shaft is then screwed home until the jaws of the vise are tightly closed and the projections 2 are in proximity with the notches 4 on the shaft.

For some kinds of vises adapted to heavy work it may be advisable in order to secure additional strength, to form the projections on the collar 1 so that they will be in paired lengths, the individuals of each pair being 180° distant from each other; that is, for each projection of any given length there will be another projection 180° distant on the circumference of the ring of substantially the same length. Or they may be made in threes, three instead of two being of equal length etc. I do not confine myself to any or either of such structures, however. Where this paired length construction of the projections is used, it will be necessary, of course, to form the notches in the shaft to correspond.

After the jaws of the vise have been closed, the collar 1 is moved lengthwise of the shaft into contact with the inner surface of the front wall 8 of the movable jaw 7. The collar 1 is then rotated until one of the projections (and its mate on the other side if that construction is used) will upon being driven down into the notch (or notches) 4, cause the collar 1 to be positioned upon the shaft in such a manner as to be in snug, yet free movable engagement with the shoulder 8. Thus the shaft 3 is able to rotate freely in its bearing in the movable jaw 7 and its longitudinal motion is communicated to the movable jaw by means of the shoulder 14 of the shaft head 15 or by the collar 1 (depending upon the direction in which the shaft is turned) without unnecessary lost motion. By having the projections of varying and graduated lengths and/or by having a number of notches in the shaft at different distances from each other along the axis of the shaft, a great many adjustments of the position of the collar 1 longitudinally along the shaft may be obtained. When the adjustment is found which gives the desired relation between the collar and the movable jaw, when the jaws are tightly closed, the proper projection or projections are bent down into the corresponding notch or notches.

It will thus be seen that my invention provides not only a positive and practically immovable positioning of the collar on the shaft, but also makes possible such an adjustment as positively prevents lost motion between the collar and the shoulder of the vise.

Having thus described my invention, what I claim as new and desire to secure by Letters Patent is:—

1. The combination of a shaft, a bearing in which said shaft is adapted to freely rotate, said shaft being provided with an enlargement adapted to contact with one side of said bearing and being provided with a plurality of notches and a smooth-bore collar fitting about said shaft, said collar having projections extending from one of the lateral faces thereof to engage in said notches whereby said collar is held immovable on said shaft and against said bearing, said projections being of graduated lengths whereby the position of the collar on the shaft may be varied in accordance with variations in the size of said bearing.

2. In a vise, the combination of a stationary jaw-supporting structure, a movable jaw-supporting structure, a screw shaft having an enlarged shoulder at one end thereof and being provided with a plurality of notches, said movable structure being provided with a bearing in which said shaft is adapted to freely rotate, a smooth-bore collar fitting about and freely movable along said shaft, said collar having projections extending from one of the lateral faces thereof to engage in said notches whereby said collar is held immovable on said shaft against the bearing, said projections being of graduated lengths whereby said collar may be adjusted according to the size of the bearing.

In testimony whereof, I have signed my name to this specification.

CHARLES FOSTER BLAKE.